United States Patent
Ni et al.

(10) Patent No.: US 9,923,481 B2
(45) Date of Patent: Mar. 20, 2018

(54) PHOTOVOLTAIC SYSTEM AND METHOD FOR CONTROLLING THE SAME

(71) Applicant: Sungrow Power Supply Co., Ltd., Hefei, Anhui (CN)

(72) Inventors: Hua Ni, Anhui (CN); Yanfei Yu, Anhui (CN); Shangfang Dai, Anhui (CN); Zongjun Yang, Anhui (CN); Wei Zhao, Anhui (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 49 days.

(21) Appl. No.: 14/865,475

(22) Filed: Sep. 25, 2015

(65) Prior Publication Data

US 2016/0094148 A1    Mar. 31, 2016

(30) Foreign Application Priority Data

Sep. 28, 2014  (CN) .......................... 2014 1 0508157

(51) Int. Cl.
*H02M 7/44*   (2006.01)
*H02J 3/38*   (2006.01)

(52) U.S. Cl.
CPC .............. *H02M 7/44* (2013.01); *H02J 3/383* (2013.01); *Y02E 10/563* (2013.01)

(58) Field of Classification Search
CPC .... H02J 3/38; H02J 5/00; H02J 3/383; H02M 7/44; H02M 1/36; H02M 7/48; H02S 40/30

(Continued)

(56) References Cited

U.S. PATENT DOCUMENTS

| 5,686,766 A | 11/1997 | Tamechika |
| 6,493,246 B2 * | 12/2002 | Suzui ........................ H02J 7/35 323/906 |

(Continued)

FOREIGN PATENT DOCUMENTS

| CN | 102130467 A | 7/2011 |
| CN | 202455150 U | 9/2012 |

(Continued)

OTHER PUBLICATIONS

First Chinese Office Action dated Jan. 25, 2016, and English Summary, for Chinese Patent Application No. 201410508157.5.

(Continued)

*Primary Examiner* — Kyle J Moody
(74) *Attorney, Agent, or Firm* — Conley Rose, P.C.

(57) ABSTRACT

Provided are a photovoltaic system and a method for controlling a photovoltaic system. The photovoltaic system includes a photovoltaic output device, an inverter device, an AC interface device, a control device and an AC load, where a supply terminal of the AC load is connected to an AC output side of the inverter device, and a control terminal of the AC load is connected to the control device, and the method for controlling the photovoltaic system is applied to the control device. The method for controlling the photovoltaic system includes: controlling the AC interface device to maintain the inverter device being disconnected from an electrical grid; starting the inverter device and then starting the AC load; and controlling the AC interface device to connect the inverter device to the electrical grid, in a case that it is determined that a grid connection condition is met for the photovoltaic system.

9 Claims, 6 Drawing Sheets

(58) Field of Classification Search
USPC .................................. 323/906; 363/95, 131
See application file for complete search history.

(56) References Cited

U.S. PATENT DOCUMENTS

| | | | |
|---|---|---|---|
| 8,395,919 B2* | 3/2013 | Schroeder | H02J 3/383 |
| | | | 363/131 |
| 2002/0105765 A1* | 8/2002 | Kondo | H02H 7/1222 |
| | | | 361/42 |
| 2007/0084498 A1 | 4/2007 | Taylor et al. | |
| 2011/0175662 A1 | 7/2011 | Said El-Barbari et al. | |
| 2012/0235484 A1 | 9/2012 | Yamada et al. | |
| 2014/0247632 A1* | 9/2014 | Phadke | H02M 7/02 |
| | | | 363/95 |
| 2016/0204691 A1* | 7/2016 | Okuda | H02J 3/383 |
| | | | 363/55 |

FOREIGN PATENT DOCUMENTS

| | | |
|---|---|---|
| CN | 103187863 A | 7/2013 |
| CN | 103560539 A | 2/2014 |
| CN | 103595236 A | 2/2014 |
| EP | 0677911 A1 | 10/1995 |
| EP | 2346084 A2 | 7/2011 |
| EP | 2469238 * | 6/2012 |
| EP | 2469238 A2 | 6/2012 |
| EP | 2991184 A1 | 3/2016 |
| JP | 2001-016782 A | 1/2001 |
| JP | 5507582 B2 | 5/2014 |
| KR | 20100129429 A | 12/2010 |

OTHER PUBLICATIONS

Chinese Patent Application No. 201410508157.5 Office Action dated Sep. 26, 2016 (8 pages).
Japanese Patent Application No. 2015-188430 Notification of Reason for Rejection dated Nov. 7, 2016 (7 pages).
Extended European Search Report dated Sep. 12, 2015, for corresponding patent application EP 15185918.8.
European Examination Report; Application No. 15185918.8; dated Jul. 20, 2017; 8 pages.

* cited by examiner

PHOTOVOLTAIC SYSTEM AND METHOD FOR CONTROLLING THE SAME

CROSS REFERENCE TO RELATED APPLICATIONS

The present application claims priority to Chinese Patent Application No. 201410508157.5, titled "PHOTOVOLTAIC SYSTEM AND METHOD FOR CONTROLLING THE SAME", filed on Sep. 28, 2014 with the State Intellectual Property Office of People's Republic of China, the entire contents of which are incorporated herein by reference.

FIELD

The disclosure relates to the field of photovoltaic technology, and in particular, to a photovoltaic system and a method for controlling a photovoltaic system.

BACKGROUND

Photovoltaic inverters are configured to convert DC power produced via a photovoltaic output device (such as a photovoltaic module, a photovoltaic string or a photovoltaic array composed of the photovoltaic modules) into AC power. According to the known output characteristics of the photovoltaic module, the photovoltaic module has a weak output load capacity and fast power changing in a case of insufficient light (for example, on a morning, evening or cloudy day). In such situations, the output voltage of the photovoltaic output device may become lower due to the output power changing of the photovoltaic output device and the loading effect of the photovoltaic inverter once the photovoltaic inverter is connected in the electrical grid, although the open circuit voltage of the photovoltaic output device reaches a needed feed-in-grid DC voltage of the photovoltaic inverter connected to the photovoltaic output device. In a case that the output voltage of the photovoltaic output device cannot maintain the grid connection of the inverter, the photovoltaic inverter is disconnected from the electrical grid and shut down, which is generally referred to as a hiccup phenomenon. The hiccup phenomenon may occur repeatedly in a case that the photovoltaic output device has the weak output load capacity. Hence, the mechanical life of grid connection switches (such as relays or AC contactors) is shortened, which results in a short operation life of the photovoltaic system, and low reliability of the photovoltaic system.

At present, the following conventional technical solution is provided, in order to avoid the hiccup phenomenon of the photovoltaic system. A switched DC load device (as shown in FIG. 1) is added at a DC side of the photovoltaic system; a DC load is put into operation in a case that the photovoltaic output device outputs weak power or the photovoltaic inverter is disconnected from the electrical grid; the power output by the photovoltaic output device is consumed by the DC load to pull low the output voltage of the photovoltaic output device, so that the photovoltaic inverter is prevent from being connected to the electrical grid due to insufficient DC voltage. After the DC load is put into operation, in a case that the output voltage of the photovoltaic output device still reaches the needed feed-in-grid DC voltage of the photovoltaic inverter, the photovoltaic output device outputs enough power to maintain the grid connection of the photovoltaic inverter. The DC load device is switched off after the photovoltaic inverter is connected to the electrical grid.

However, an additional DC load is needed in the conventional technical solution stated above, therefore, the cost of the photovoltaic system is increased, and the volume of the photovoltaic system is increased since the DC load takes up space.

SUMMARY OF THE DISCLOSURE

The present disclosure describes a photovoltaic system and a method for controlling a photovoltaic system offering the potential to reduce the number of occurrences of a hiccup phenomenon for the photovoltaic system, and doing so without having to provide an additional DC load.

Thus, a method for controlling a photovoltaic system is provided, the photovoltaic system includes a photovoltaic output device, an inverter device, an AC interface device, a control device and an AC load, where a supply terminal of the AC load is connected to an AC output side of the inverter device, and a control terminal of the AC load is connected to the control device, and the method for controlling the photovoltaic system is applied to the control device; and the method for controlling the photovoltaic system includes:

controlling the AC interface device to maintain the inverter device being disconnected from an electrical grid;

starting the inverter device and then starting the AC load;

determining whether a grid connection condition is met for the photovoltaic system; and controlling the AC interface device to connect the inverter device to the electrical grid, in a case that it is determined that the grid connection condition is met for the photovoltaic system, where the grid connection condition is used to determine whether power output by the photovoltaic output device is capable of maintaining the stable operation of the inverter device and the AC load.

In an embodiment the determining whether a grid connection condition is met for the photovoltaic system may include:

determining whether an input voltage at a DC side of the inverter device is greater than a voltage threshold; and determining that the grid connection condition is met for the photovoltaic system, in a case that the input voltage at the DC side of the inverter device is greater than the voltage threshold; or delaying a preset period of time, and then determining whether the input voltage at the DC side of the inverter device is greater than the voltage threshold again, in a case that the input voltage of the inverter device at the DC side is not greater than the voltage threshold.

In an embodiment, the determining whether a grid connection condition is met for the photovoltaic system may include:

determining whether the inverter device and the AC load are operating without powering down in a first preset period of time; and determining that the grid connection condition is met for the photovoltaic system, in a case that the inverter device and the AC load are operating without powering down in the first preset period of time; or delaying a second preset period of time, then starting the inverter device and the AC load, and determining whether the inverter device and the AC load are operating without powering down in the first preset period of time again, in a case that the inverter device and the AC load are powering down in the first preset period of time.

In an embodiment, the determining whether a grid connection condition is met for the photovoltaic system may include:

controlling an input voltage at a DC side of the inverter to be a predetermined value;

determining whether an output power at an AC side of the inverter device is greater than a power threshold; and determining that the grid connection condition is met for the photovoltaic system, in a case that the output power at the AC side of the inverter device is greater than the power threshold; or delaying a preset period of time, and then determining whether the output power at the AC side of the inverter device is greater than the power threshold again, in a case that the output power at the AC side of the inverter device is not greater than the power threshold.

In an embodiment, the determining whether a grid connection condition is met for the photovoltaic system may include:

controlling a sum of a power consumed by the inverter device and a power consumed by the AC load to be a predetermined value;

determining whether the inverter device is capable of operating at a current power point; and determining that the grid connection condition is met for the photovoltaic system, in a case that the inverter device is capable of operating at the current power point; or delaying a preset period of time, and then determining whether the inverter device is capable of operating at the current power point, in a case that the inverter device is not capable of operating at the current power point.

In an embodiment, in a case that the control device is powered by the DC side of the photovoltaic system, after the inverter device and the AC load are started, the method for controlling the photovoltaic system further may include:

limiting an operating power of the inverter device and an operating power of the AC load, to prevent the control device from powering down.

In an embodiment, the AC load may be connected to the AC output side of the inverter device via a switch, a control terminal of the switch may be connected to the control device; after the controlling the AC interface device to connect the inverter device to the electrical grid, the method for controlling the photovoltaic system may further include: controlling the switch to be turned off.

Further, a photovoltaic system is disclosed that includes a photovoltaic output device, an inverter device, an AC interface device, a control device and an AC load; a supply terminal of the AC load is connected to an AC output side of the inverter device, and a control terminal of the AC load is connected to the control device; and the control device controls the AC interface device to maintain the inverter device being disconnected from an electrical grid, starts the inverter device, then starts the AC load; and controls the AC interface device to connect the inverter device to the electrical grid, in a case that a grid connection condition is met for the photovoltaic system, specifically, the grid connection condition is used to determine whether power output by the photovoltaic output device is capable of maintaining the stable operation of the inverter device and the AC load.

In an embodiment, the AC load may include any one or more of a fan, a heater and a dehumidifier.

In an embodiment, the AC interface device may include grid connection switches, and control terminals of the grid connection switches may be connected to the control device.

Employing the method for controlling the photovoltaic system according to the present disclosure, in a case that the inverter device is disconnected from the electrical grid, the power output by the photovoltaic output device is consumed by the AC load in the photovoltaic system; the inverter device is controlled to be connected in the electrical grid, in a case that the power produced by the photovoltaic output device is enough to maintain the stable operation of the inverter device and the AC load; the control device can operate continuously rather than being disconnected from the electrical grid and stopped since the photovoltaic output device produces substantial power. Compared with the conventional technology, the number of occurrences of the hiccup phenomenon for the photovoltaic system can be decreased without needing to provide an additional DC load, and the cost and volume of the photovoltaic system are therefore not increased by such an addition. Furthermore, before the inverter device is connected to the electrical grid, the AC load can make full use of the power produced by the photovoltaic output device, such that power need not be drawn from the electrical grid.

BRIEF DESCRIPTION OF THE DRAWINGS

The drawings used in the description of embodiments of the disclosure or the conventional technology are described briefly as follows It is apparent that the drawings only illustrate some embodiments of the present disclosure. For those skilled in the art, other drawings may be obtained according to these drawings without any inventive work.

DETAILED DESCRIPTION OF THE DISCLOSED EXEMPLARY EMBODIMENTS

Exemplary embodiments of the present disclosure are described clearly and completely below in conjunction with the drawings. These exemplary embodiments are only a few rather than all of the embodiments of the present disclosure. Other embodiments obtained by those skilled in the art without any inventive work based on the provided disclosure fall into the scope of protection of the present disclosure.

A method for controlling a photovoltaic system is disclosed that, compared with the conventional technology, may decrease the number of occurrences of a hiccup phenomenon without needing to provide an additional DC load.

Figure 7:
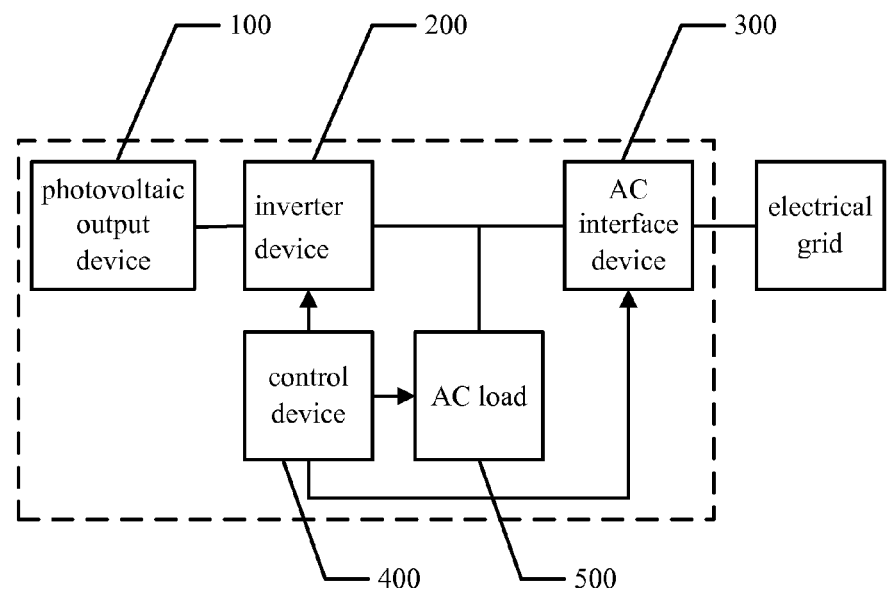
FIG. 7 is a schematic structural view of a photovoltaic system according to the present disclosure.

The photovoltaic system according to the present disclosure has a structure as shown in FIG. 7, which includes: a photovoltaic output device 100, an inverter device 200, an AC interface device 300, a control device 400 and an AC load 500. The photovoltaic output device 100 is connected to a DC input side of the inverter device 200, an AC output side of the inverter device 200 is connected to an electrical grid via the AC interface device 300, and a supply terminal of the AC load 500 is connected to an AC output side of the inverter device 200. Furthermore, control terminals of the inverter device 200, the AC interface device 300 and the AC load 500 are connected to the control device 400. The photovoltaic output device 100 is configured to convert solar energy into power, the inverter device 200 converts DC power output by the photovoltaic output device 100 into AC power, and then the AC power is transmitted to the electrical grid via the AC interface device 300. Furthermore, the AC load 500 may be powered by the inverter device 200. It should be noted that, in order to ensure the photovoltaic system to operate stably, it is needed to provide the AC load such as a fan, a dehumidifier, a heater or the like in the photovoltaic system. In the conventional photovoltaic system, the AC load is connected to the electrical grid and powered by the electrical grid. In the present disclosure, the supply terminal of the AC load 500 is connected to the AC output side of the inverter device 200.

Figure 1:
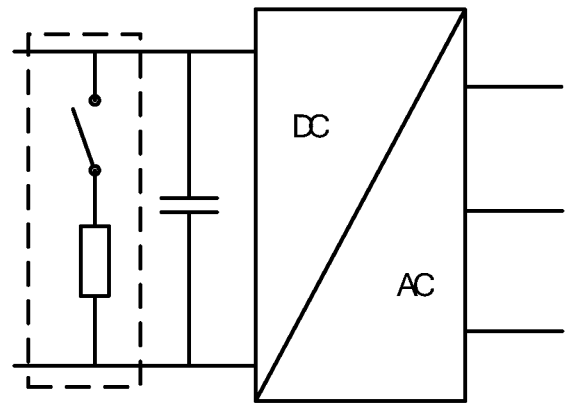
FIG. 1 is a schematic structural view of a DC load provided for a photovoltaic system according to the conventional technology.
Figure 2:
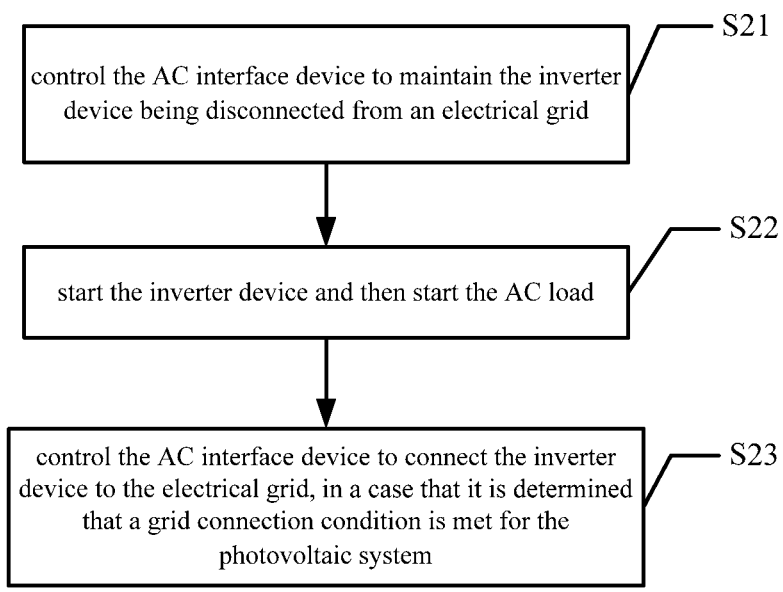
FIG. 2 is a flowchart of a method for controlling a photovoltaic system according to the present disclosure.

FIG. 2 is a flowchart of a method for controlling a photovoltaic system according to the present disclosure. The method for controlling the photovoltaic system is applied to a control device in the photovoltaic system, and the method includes steps S21 to S23.

In step S21, the AC interface device is controlled to maintain an inverter device being disconnected from an electrical grid.

The inverter device is disconnected from the electrical grid in a case that the photovoltaic system is started initially. The control device controls the AC interface device to maintain the inverter device being disconnected from an electrical grid, that is, the inverter device is controlled to be disconnected from the electrical grid.

In step S22, the inverter device is started, and then the AC load is started.

After the inverter device is controlled to be disconnected from the electrical grid, the control device controls the inverter device to be started. In this case, the inverter device converts DC power output by the photovoltaic output device into AC power. Thereafter, the control device controls the AC load to be started, and the AC load consumes the AC power output by the inverter device.

In step S23, the AC interface device is controlled to connect the inverter device to the electrical grid, in a case that it is determined that a grid connection condition is met for the photovoltaic system. Specifically, the grid connection condition is used to determine whether power output by the photovoltaic output device is capable of maintaining the stable operation of the inverter device and the AC load.

After the inverter device and the AC load are started, the control device determines whether the grid connection condition is met for the photovoltaic system. The AC interface device is controlled to connect the inverter device to the electrical grid, that is, the inverter device is controlled to be run in the grid connected mode, in a case that it is determined that the grid connection condition is met for the photovoltaic system; or after a preset period of time is delayed, the control device determines whether the grid connection condition is met for the photovoltaic system again, in a case that it is determined that the grid connection condition is not met for the photovoltaic system.

It can be determined that the power output by the photovoltaic output device is capable of maintaining the stable operation of the inverter device and the AC load in a case that the grid connection condition is met for the photovoltaic system. That is, in a case that the photovoltaic output device outputs enough power to maintain the grid connection of the photovoltaic inverter without occurrence of the hiccup phenomenon, the photovoltaic inverter is controlled to be connected in the electrical grid.

With the method for controlling the photovoltaic system according to the present disclosure, in a case that the inverter device is disconnected from the electrical grid, the power output by the photovoltaic output device is consumed by the AC load in the photovoltaic system; the inverter device is controlled to be connected in the electrical grid, in a case that the power produced by the photovoltaic output device is enough to maintain the stable operation of the inverter device and the AC load; the control device can operate continuously rather than being disconnected from the electrical grid and stopped since the photovoltaic output device produces substantial power. Compared with the conventional technology, the number of occurrences of the hiccup phenomenon for the photovoltaic system can be decreased without needing to provide an additional DC load, and the cost and volume of the photovoltaic system are not increased. Furthermore, before the inverter device is connected to the electrical grid, the AC load can make full use of the power produced by the photovoltaic output device, so that drawing power from the electrical grid can be avoided.

In practice, there are various implementation ways to determine whether the grid connection condition is met for the photovoltaic system, which are described as follows.

Figure 3:
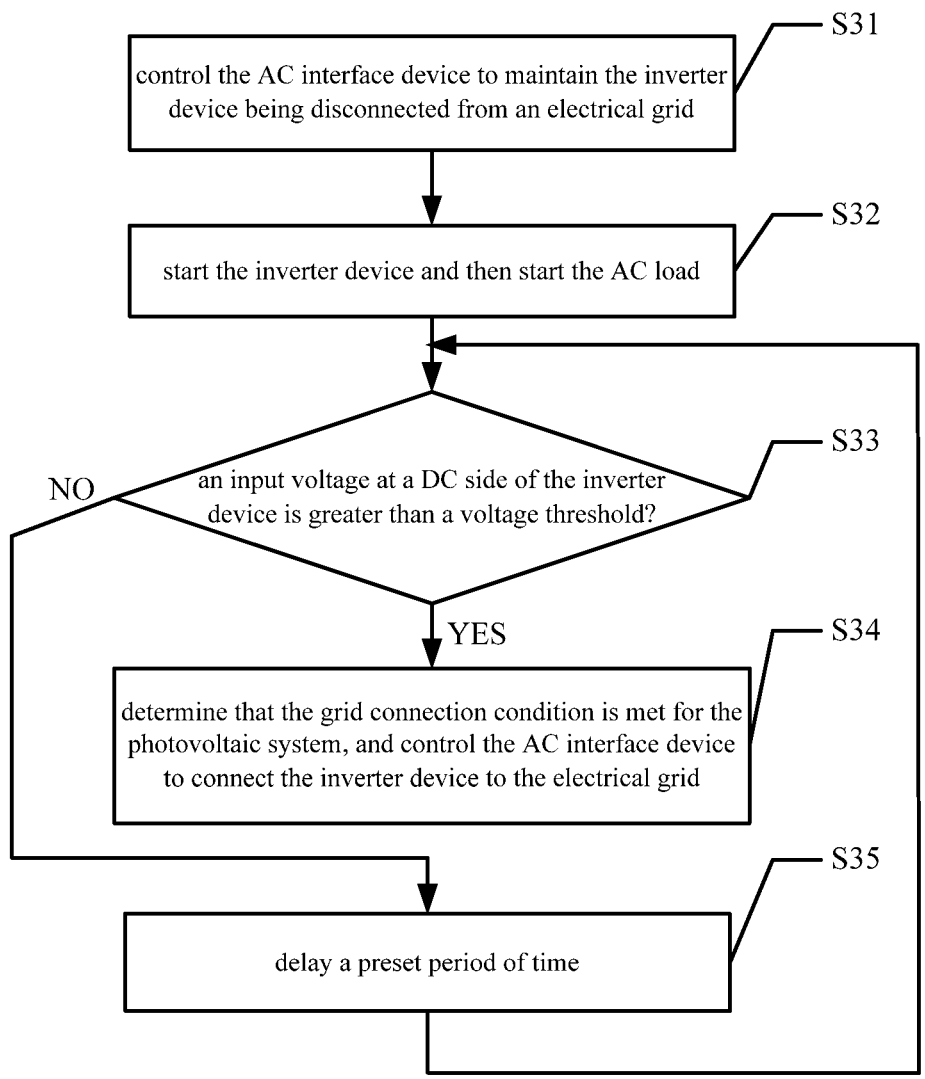
FIG. 3 is a flowchart of a method for controlling a photovoltaic system according to the present disclosure.

FIG. 3 is a flowchart of a method for controlling a photovoltaic system according to the present disclosure. The method for controlling the photovoltaic system is applied to a control device in the photovoltaic system, and the method includes steps S31 to S35.

In step S31, an AC interface device is controlled to maintain an inverter device being disconnected from an electrical grid.

In step S32, the inverter device is started, and then an AC load is started.

In step S33, it is determined whether an input voltage at a DC side of the inverter device is greater than a voltage threshold; step S34 is performed in a case that the input voltage at the DC side of the inverter device is greater than the voltage threshold; or step S35 is performed in a case that the input voltage at the DC side of the inverter device is not greater than the voltage threshold.

After the invert device and the AC load are controlled to operate, it may be determined that a grid connection condition is met for the photovoltaic system, in the case that the input voltage at the DC side of the inverter device can still be greater than the voltage threshold, for example, the input voltage at the DC side of the inverter device is greater than a voltage peak of the electrical grid.

In step S34, it is determined that the grid connection condition is met for the photovoltaic system, and the AC interface device is controlled to connect the inverter device to the electrical grid.

In step S35, a preset period of time is delayed, and step S35 is performed again.

With the method for controlling the photovoltaic system as shown in FIG. 3 according to the present disclosure, after the inverter device and the AC load are started, in the case that the input voltage at the DC side of the inverter device can still be greater than the voltage threshold, an output power of the inverter device can meet power consumption requirement for its own operation, and the power may be transmitted to the electrical grid rather than being drawn from the electrical grid after the grid connection. Hence, the grid connection condition is met for the photovoltaic system, and the inverter device is controlled to be connected in the electrical grid without occurrence of the hiccup phenomenon.

Figure 4:
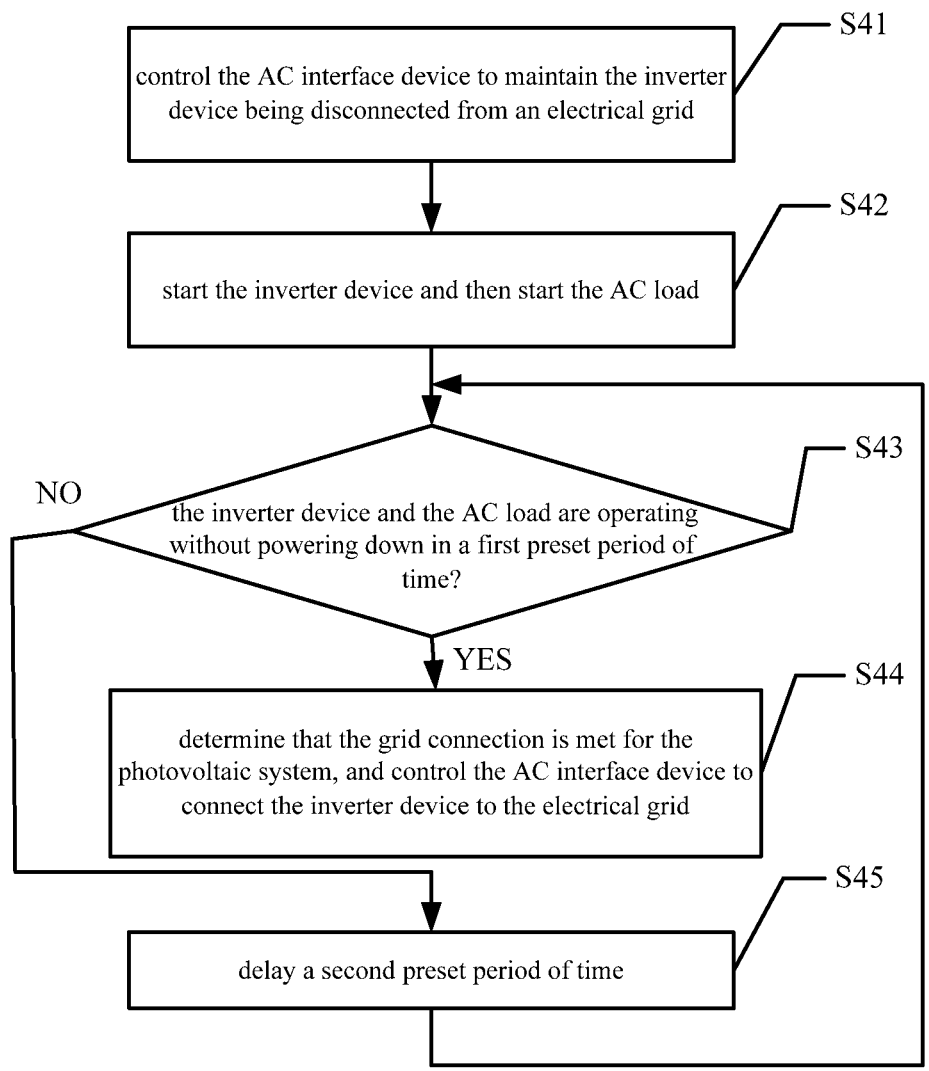
FIG. 4 is a flowchart of a method for controlling a photovoltaic system according to the present disclosure.

FIG. 4 is a flowchart of a method for controlling a photovoltaic system according to the present disclosure. The method for controlling the photovoltaic system is applied to a control device in the photovoltaic system, and the method includes steps S41 to S45.

In step S41, an AC interface device is controlled to maintain an inverter device being disconnected from an electrical grid.

In step S42, the inverter device is started, and then an AC load is started.

In step S43, it is determined whether the inverter device and the AC load are operating without powering down in a first preset period of time; step S44 is performed, in a case that the inverter device and the AC load are operating without powering down in the first preset period of time; or step S45 is performed in a case that the inverter device and the AC load are powering down in the first preset period of time.

After the inverter device and the AC load are controlled to operate, it may be determined that a grid connection condition is met for the photovoltaic system, in the case that the inverter device and the AC load can be operating without powering down in the preset period of time.

In step S44, it is determined that the grid connection condition is met for the photovoltaic system, and the AC interface device is controlled to connect the inverter device to the electrical grid.

In step S45, a second preset period of time is delayed, then the inverter device and the AC load are started, and step S43 is performed again.

With the method for controlling the photovoltaic system as shown in FIG. 4 according to the present disclosure, after the inverter device and the AC load are started, in a case that the inverter device and the AC load can be operating without powering down in the preset period of time, an output power of the inverter device can meet power consumption requirement for its own operation, and the power can be transmitted to the electrical grid rather than being drawn from the electrical grid after the grid connection. Hence, the grid connection condition is met for the photovoltaic system, and the inverter device is controlled to be connected in the electrical grid without occurrence of the hiccup phenomenon.

Figure 5:
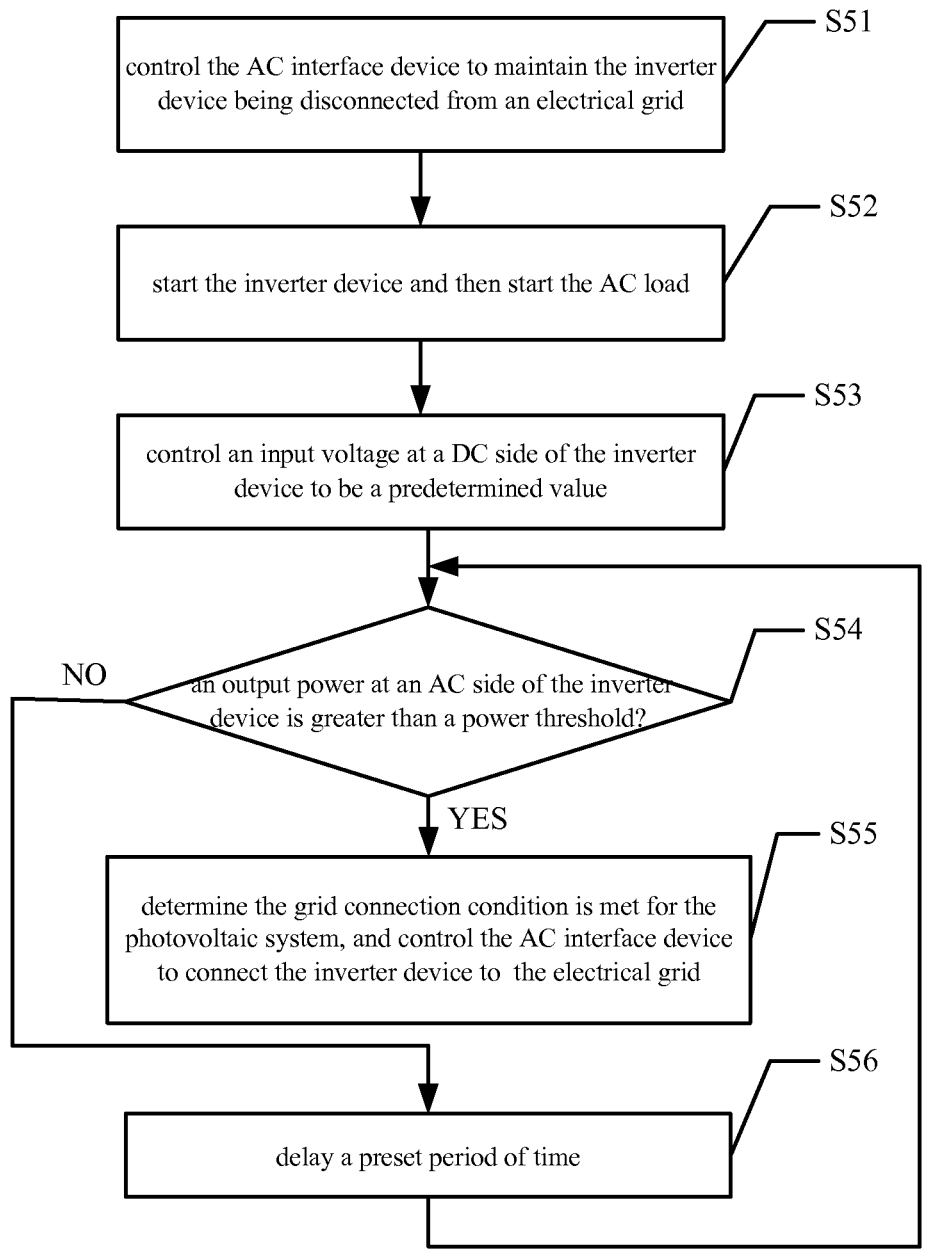
FIG. 5 is a flowchart of a method for controlling a photovoltaic system according to the present disclosure.

FIG. 5 is a flowchart of a method for controlling a photovoltaic system according to the present disclosure. The method for controlling the photovoltaic system is applied to a control device in the photovoltaic system, and the method includes steps S51 to S56.

In step S51, an AC interface device is controlled to maintain an inverter device being disconnected from an electrical grid.

In step S52, the inverter device is started, and then an AC load is started.

In step S53, an input voltage at a DC side of the inverter device is controlled to be a predetermined value.

In step S54, it is determined whether an output power at an AC side of the inverter device is greater than a power threshold: step S55 is performed in a case that the output power at the AC side of the inverter device is greater than the power threshold; or step S56 is performed in a case that the output power at the AC side of the inverter device is not greater than the power threshold.

After the inverter device and the AC load are controlled to operate, the input voltage at the DC side of the inverter device is controlled to be the predetermined value. In the case that the output power at the AC side of the inverter device is greater than the power threshold, for example, the output power at the AC side of the inverter device is greater than a loss power for itself grid connection, it can be ensured that the inverter device outputs power after the grid connection of the inverter device without drawing power from the electrical grid, and hence it is determined that a grid connection condition is met for the photovoltaic system.

In step S55, it is determined the grid connection condition is met for the photovoltaic system, and the AC interface device is controlled to connect the inverter device to the electrical grid.

In step S56, a preset period of time is delayed, and step S53 is performed again.

With the method for controlling the photovoltaic system as shown in FIG. 5 according to the present disclosure, after the inverter device and the AC load are started, the input voltage at the DC side of the inverter device is controlled to be the predetermined value, in a case that the output power at the AC side of the inverter device is greater than the power threshold, an output power output by the inverter device can meet power consumption requirement for its own operation, and the power can be transmitted to the electrical grid rather than being drawn from the electrical grid after the grid connection. Hence, the grid connection condition is met for the photovoltaic system, and the inverter device is controlled to be connected in the electrical grid without occurrence of the hiccup phenomenon.

Figure 6:
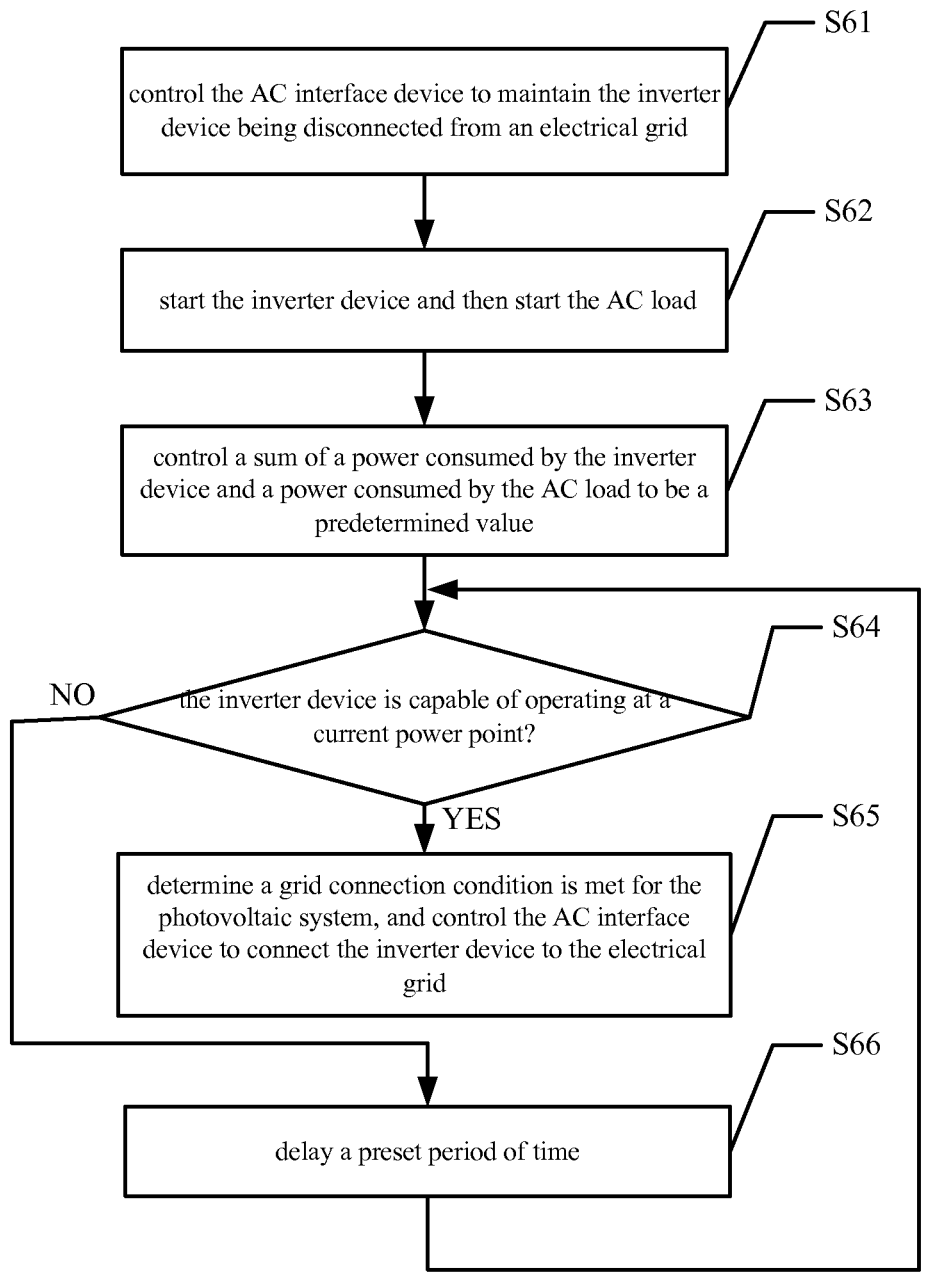
FIG. 6 is a flowchart of a method for controlling a photovoltaic system according to the present disclosure.

FIG. 6 is a flowchart of a method for controlling a photovoltaic system according to the present disclosure. The method for controlling the photovoltaic system is applied to a control device in the photovoltaic system, and the method includes steps S61 to S66.

In step S61, an AC interface device is controlled to maintain an inverter device being disconnected from an electrical grid.

In step S62, the inverter device is started, and then an AC load is started.

In step S63, a sum of a power consumed by the inverter device and a power consumed by the AC load is controlled to be a predetermined value.

In step S64, it is determined whether the inverter device is capable of operating at a current power point; step S65 is performed, in a case that the inverter device is capable of operating at the current power point; or step S66 is performed, in a case that the inverter device is not capable of operating at the current power point.

After the inverter device and the AC load are controlled to operate, the sum of the power consumed by the inverter device and the power consumed by the AC load is controlled to be the predetermined value. In the case that the inverter device is capable of operating at the current power point, it can be ensured that the inverter device outputs power after the grid connection of the inverter device without drawing power from the electrical grid and hence it is determined that a grid connection condition is met for the photovoltaic system.

In step S65, it is determined the grid connection condition is met for the photovoltaic system, and the AC interface device is controlled to connect the inverter device to the electrical grid.

In step S66, a preset period of time is delayed, and step S63 is performed again.

With the method for controlling the photovoltaic system as shown in FIG. 6 according to the present disclosure, after the inverter device and the AC load are started, the sum of the power consumed by the inverter device and the power consumed by the AC load is controlled to be a predetermined value. In the case that the inverter device is capable of operating at the current power point, an output power output by the inverter device can meet power consumption requirement for its own operation, and the power can be transmitted to the electrical grid rather than being drawn from the electrical grid after the grid connection. Hence, the grid connection condition is met for the photovoltaic system, and the inverter device is controlled to be connected in the electrical grid without occurrence of the hiccup phenomenon.

In a case that the control device of the photovoltaic system is powered by the DC side of the photovoltaic system, after the inverter device and the AC load are started, the above-described method for controlling the photovoltaic system according to the disclosure further includes the following step: limiting an operating power of the inverter device and an operating power of the AC load to prevent the control device from powering down. For example, in a case that the inverter device is not capable of operating at the current power point in step S64, a step that the operating power of the inverter device and the operating power of the AC load are limited to be less than a predetermined power may be added to prevent the inverter device from powering down. Then step S66 is performed.

Alternatively, in a case that the AC load of the photovoltaic system is connected to the AC output side of the inverter device via a switch and a control terminal of the switch is connected to the control device, after the AC interface is controlled to connect the inverter device to the electrical grid, the above-described method for controlling the photovoltaic system according to the present disclosure further includes the following steps: controlling the switch to be turned off.

In a case that the AC load of the photovoltaic system includes multiple devices, each of the devices may be configured to be connected to the AC output side of the inverter device via a switch. After the AC interface is controlled to connect the inverter device and the electrical grid, a few of the switches may be turned off based on operation requirement of the system, that is, a few of the AC loads of the photovoltaic system are disconnected from the inverter device, and a few of the AC loads are still powered by the power produced by the photovoltaic output device. For example, a fan is needed to assist in dissipating heat in a case that the photovoltaic system is in a high temperature environment, and the fan may be powered by the power produced by the photovoltaic output device in a case that the photovoltaic output device produces such power.

A photovoltaic system is further disclosed according to the present disclosure. The photovoltaic system has a structure as shown in FIG. 7, which includes a photovoltaic output device 100, an inverter device 200, an AC interface device 300, a control device 400 and an AC load 500.

The photovoltaic output device 100 is connected to a DC input side of the inverter device 200, an AC output side of the inverter device 200 is connected to an electrical grid via the AC interface device 300, and a supply terminal of the AC load 500 is connected to an AC output side of the inverter device 200. Furthermore, control terminals of the inverter device 200, the AC interface device 300 and the AC load 500 are connected to the control device 400. The photovoltaic output device 100 is configured to convert solar energy into power, the inverter device 200 converts DC power output by the photovoltaic output device 100 into AC power, and then the AC power is transmitted to the electrical grid via the AC interface device 300. Furthermore, the AC load 500 may be powered by the inverter device 200. In order to ensure the stable operation of the photovoltaic system, it is needed to provide the AC load such as a fan, a dehumidifier, a heater or the like in the photovoltaic system. In the conventional photovoltaic system, the AC load is connected to the electrical grid and powered by the electrical grid. In the present disclosure, the supply terminal of the AC load 500 is connected to the AC output side of the inverter device 200.

It should be noted that the type of the AC load 500 is not limited to three types of the AC load 500 described above.

After the photovoltaic system is started, the control device 400 controls the AC interface device 300 to maintain the inverter device 200 being disconnected from the electrical grid. Then the control device 400 starts the inverted device 200 and the AC load 500, and the control device 400 controls the AC interface device 300 to connect the inverter device 200 to the electrical grid in a case that it is determined that a grid connection condition is met for the photovoltaic system. The grid connection condition is used to determine whether power output by the photovoltaic output device 100 is capable of maintaining the stable operation of the inverter device 200 and the AC load 500.

With the photovoltaic system according to the present disclosure, in a case that the inverter device is disconnected from the electrical grid, the power output by the photovoltaic output device is consumed by the AC load in the photovoltaic system; the inverter device is controlled to be connected in the electrical grid, in a case that the power produced by the photovoltaic output device is enough to maintain the stable operation of the inverter device and the AC load; the control device can operate continuously rather than being disconnected from the electrical grid and stopped since the photovoltaic output device produces much power. Compared with the conventional technology, the number of occurrences of the hiccup phenomenon for the photovoltaic system can be decreased without needing to provide an additional DC load, and the cost and volume of the photovoltaic system are not increased. Furthermore, before the inverter device is connected to the electrical grid, the AC load can make full use of the power produced by the photovoltaic output device, and it is avoided to draw power from the electrical grid.

Furthermore, in the photovoltaic system according to the present disclosure, the photovoltaic output device 100, the inverter device 200, the AC interface device 300 and the AC load 500 each have various structures, which are described as follows.

The photovoltaic output device 100 may be a single photovoltaic module, multiple photovoltaic modules, a single photovoltaic string, multiple photovoltaic strings or a photovoltaic array.

The inverter device 200 includes a DC/AC converter which converts the input DC power into AC power to be output. In an embodiment, the inverter device 200 may further include a filtering device such as an AC reactor.

The AC interface device 300 includes grid connection switches of which control terminals are connected to the control device 400. The grid connection switches are configured to connect the inverter device 200 to the electrical grid or disconnect the inverter device 200 from the electrical grid under the control of the control device 400. The grid connection switches may be AC relays or AC contactors.

In an embodiment, the AC interface device 300 may further include, for example, one or more of an AC filtering device, an AC protection device, a bus power distribution device, and an industrial frequency transformer.

The AC filtering device is configured to improve the quality of an AC waveform or the EMI environment, and the AC filtering device may be an AC reactor, an AC capacitor, a differential mode inductor, a common mode inductor, an X capacitor or a Y capacitor, as examples.

The AC protection device is configured to perform safety protection on the device, the personal safety and the electrical grid, and the AC protection device includes one or more of a lightning protection device, a changing protective device, an AC fuse and an AC circuit breaker, as examples.

The bus power distribution device is configured to converge multiple incoming AC power lines into less outgoing AC power lines, and the bus power distribution device may also connect or disconnect the incoming AC power lines and the outgoing AC power lines, as examples.

The industrial frequency transformer is configured to isolate electrically the photovoltaic system from the electrical grid and transform a voltage level.

The AC load 500 includes any one or more of a fan, a heater and a dehumidifier, as examples.

In an embodiment, a DC interface device may be provided between the photovoltaic output device 100 and the inverter device 200.

The DC interface device may include a bus wiring device. The bus wiring device is configured to connect multiple incoming DC power lines of the photovoltaic output device 100 in parallel, converge the multiple incoming DC power lines into less outgoing DC power lines, and the DC interface device may also connect or disconnect the incoming DC power lines and the outgoing DC power lines.

In an embodiment, one or more of a DC conversion device, a DC filtering device and a DC protection device may be provided in the DC interface device.

The DC conversion device may include an isolation type DC conversion device or a non-isolation type DC conversion device, which converts DC power into DC output having different characteristics, for example, DC power having a variable voltage output by the photovoltaic output device 100 is converted into DC power having a stable voltage.

The DC filtering device is configured to improve the quality of DC waveform or the EMI (Electro-Magnetic Interference) environment, and the DC filtering device may be a DC reactor, a DC capacitor, a differential mode inductor, a common mode inductor, an X capacitor or a Y capacitor, as examples.

The DC protection device is configured to perform safety protection on the device and the personal safety, and the DC protection device includes one or more of a lightning protection device, a changing protective device, a GFDI (Ground-Fault Detector Interrupter), an anti-reverse diode, a DC fuse and a DC circuit breaker, as examples.

Figure 8:
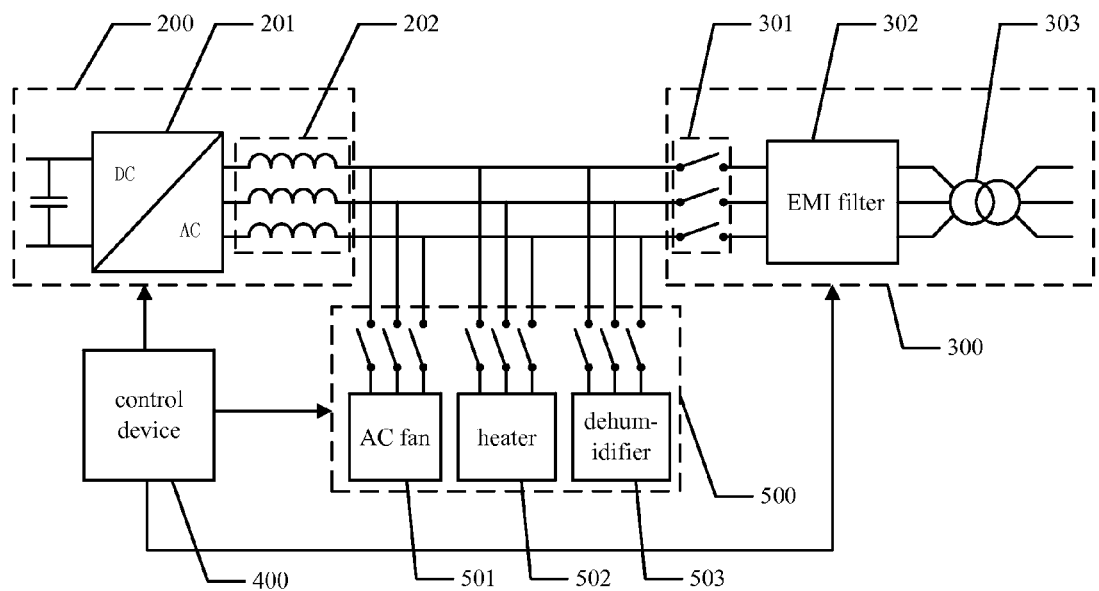
FIG. 8 is a schematic structural view of a part of a photovoltaic system according to the present disclosure.

FIG. 8 is a schematic structural view of a part of a photovoltaic system according to the present disclosure. An inverter device 200 includes a DC/AC converter 201 and a filter reactor 202. An AC interface device 300 includes a gird connection switch 301, an EMI filter 302 and an isolation transformer 303. An AC load 500 includes an AC fan 501, a heater 502 and a dehumidifier 503.

It should be noted that the type of the AC load 500 is not limited to three types of the AC load 500 described above.

Finally, it should be noted that the relationship terminologies such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, the process, method, article or device including a series of elements includes not only the disclosed elements but may also include other elements that are not enumerated, or further may include inherent elements of the process, method, article or device. Unless expressively limited otherwise, the statement "including a . . . " does not exclude the case that other similar elements may exist in the process, method, article or device other than enumerated elements.

The embodiments of the present disclosure are described herein in a progressive manner, with an emphasis placed on explaining the difference between each embodiment and the other embodiments. The same or similar parts among the embodiments can be referred to each other. For the device disclosed in the embodiments, the corresponding descriptions are relatively simple because the apparatus correspond to the methods disclosed in the embodiments. The relevant portions may be referred to the description of the method parts.

The above description of the disclosed exemplary embodiments enables those skilled in the art to implement or use the present disclosure. From this disclosure, numerous modifications to the exemplary embodiments will be apparent to those skilled in the art, and the general principles defined herein can be implemented in other embodiments without deviating from the spirit or scope of the present disclosure. Therefore, the present disclosure is not limited to the exemplary embodiments described herein, but is to conform to the widest scope consistent with all that has been disclosed herein.

The invention claimed is:

1. A method for controlling a photovoltaic system, the photovoltaic system comprising a photovoltaic output device, an inverter device, an AC interface device, a control device and an AC load, wherein a supply terminal of the AC load is connected to an AC output side of the inverter device, and a control terminal of the AC load is connected to the control device, and the method for controlling the photovoltaic system is applied to the control device and comprises:
   controlling the AC interface device to maintain the inverter device being disconnected from an electrical grid;
   starting the inverter device and then starting the AC load;
   determining whether a grid connection condition is met for the photovoltaic system; and
   controlling the AC interface device to connect the inverter device to the electrical grid, in a case that it is determined that the grid connection condition is met for the photovoltaic system, wherein the grid connection condition is used to determine whether power output by the photovoltaic output device is capable of maintaining a stable operation of the inverter device and the AC load,
   wherein the AC load comprises any one or more of a fan and a dehumidifier.

2. The method for controlling the photovoltaic system according to claim 1, wherein in a case that an input voltage at a DC side of the inverter device is greater than a voltage threshold, the grid connection condition is met for the photovoltaic system, and wherein in a case that the input voltage of the inverter device at the DC side is not greater than the voltage threshold, after a preset period of time, it is determined whether the input voltage at the DC side of the inverter device is greater than the voltage threshold again.

3. The method for controlling the photovoltaic system according to claim 1, wherein in a case that the inverter device and the AC load are operating without powering down in a first preset period of time, the grid connection condition is met for the photovoltaic system, and wherein in a case that the inverter device and the AC load are powering down in the first preset period of time, after a second preset period of time, the inverter device and the AC load are started, and it is determined whether the inverter device and the AC load are operating without powering down in the first preset period of time.

4. The method for controlling the photovoltaic system according to claim 1, wherein, in a case that an output power at an AC side of the inverter device is greater than a power threshold when an input voltage at a DC side of the inverter device is controlled to be a predetermined value, the grid connection condition is met for the photovoltaic system, and wherein in a case that the output power at the AC side of the inverter device is not greater than the power threshold when the input voltage at the DC side of the inverter device is controlled to be the predetermined value, after a preset period of time, it is determined whether the output power at the AC side of the inverter device is greater than the power threshold again.

5. The method for controlling the photovoltaic system according to claim 1, wherein in in a case that the inverter device is capable of operating at a current power point when a sum of a power consumed by the inverter device and a power consumed by the AC load is controlled to be a predetermined value, the grid connection condition is met for the photovoltaic system, and wherein in a case that the inverter device is not capable of operating at the current power point when the sum of the power consumed by the inverter device and the power consumed by the AC load is controlled to be a predetermined value, after a preset period of time, it is determined whether the inverter device is capable of operating at the current power point.

6. The method for controlling the photovoltaic system according to claim 1, wherein in a case that the control device is powered by the DC side of the photovoltaic system, after the inverter device and the AC load are started, the method for controlling the photovoltaic system further comprises limiting an operating power of the inverter device and an operating power of the AC load, to prevent the control device from powering down.

7. The method for controlling the photovoltaic system according to claim 1, wherein the AC load is connected to the AC output side of the inverter device via a switch, a control terminal of the switch is connected to the control device; after the controlling the AC interface device to connect the inverter device to the electrical grid, the method for controlling the photovoltaic system further comprises: controlling the switch to be turned off.

8. A photovoltaic system, comprising a photovoltaic output device, an inverter device, an AC interface device, a control device and an AC load, wherein
   a supply terminal of the AC load is connected to an AC output side of the inverter device, and a control terminal of the AC load is connected to the control device; and
   the control device controls the AC interface device to maintain the inverter device being disconnected from an electrical grid, starts the inverter device, then starts the AC load; and controls the AC interface device to connect the inverter device to the electrical grid, in a case that a grid connection condition is met for the photovoltaic system, wherein the grid connection condition is used to determine whether power output by the photovoltaic output device is capable of maintaining a stable operation of the inverter device and the AC load,
   wherein the AC load comprises any one or more of a fan a dehumidifier.

9. The photovoltaic system according to claim 8, wherein the AC interface device comprises grid connection switches, and control terminals of the grid connection switches are connected to the control device.

* * * * *